United States Patent
Sykes et al.

[11] Patent Number: 6,062,552
[45] Date of Patent: *May 16, 2000

[54] PREASSEMBLY CUTTER CLAMP FOR USE DURING TIRE PRODUCTION

[75] Inventors: Richard R. Sykes, Sharpsburg; Michael L. Wood, Wilson, both of N.C.

[73] Assignee: Bridgestone/Firestone, Inc., Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/797,096

[22] Filed: Feb. 7, 1997

[51] Int. Cl.⁷ .............................. B29D 30/06; B26D 7/02
[52] U.S. Cl. ......................... 269/32; 269/238; 269/257; 83/282; 83/451; 83/452; 83/461; 156/406.4
[58] Field of Search ..................................... 269/238, 266, 269/270, 275, 25, 27, 32, 56, 224, 257; 83/262, 282, 375, 388, 390, 452, 461, 465, 451; 156/406.4

[56] References Cited

U.S. PATENT DOCUMENTS

| | | | |
|---|---|---|---|
| 2,236,913 | 4/1941 | Merrill | 269/270 X |
| 2,398,658 | 4/1946 | Mead | 269/270 X |
| 2,727,325 | 12/1955 | Jurinic | 269/275 X |
| 2,903,929 | 9/1959 | McVey | 269/270 X |
| 4,351,516 | 9/1982 | Ersoy et al. | 269/27 |
| 4,526,647 | 7/1985 | Portalupi et al. | 156/406.4 |
| 4,617,074 | 10/1986 | Portalupi et al. | 156/130 |
| 4,778,163 | 10/1988 | Spear | 269/32 |
| 4,844,768 | 7/1989 | Kimura | 156/361 |
| 5,226,638 | 7/1993 | Ausilio | 269/238 |
| 5,246,216 | 9/1993 | Oberst | 269/275 X |
| 5,248,374 | 9/1993 | Shimizu et al. | 156/406.4 |
| 5,405,484 | 4/1995 | Wollbrinck et al. | 156/416 |

*Primary Examiner*—Clark F. Dexter
*Attorney, Agent, or Firm*—Michael Sand; John M. Vasuta

[57] ABSTRACT

A cutter clamp assembly for holding the elongated strip of tire material during the cutting process, whereby predetermined lengths of tire material are created to be formed into a tire. The cutter clamp is an air actuated clamp that is pivoted into engagement with a sidewall section of the elongated strip of tire material as air suction from an air manifold holds the entire elongated strip down so as to assure a uniform and even cut. The cutter clamp includes a clamp bar that is spring loaded by a tension bar such that during engagement the clamp bar evenly distributes a force along the entire sidewall adjacent to the cutter such that an even cut is started upon contact by the cutter with the elongated strip of tire material, whereby the air suction manifold holds down the entire elongated strip during cutting.

9 Claims, 3 Drawing Sheets

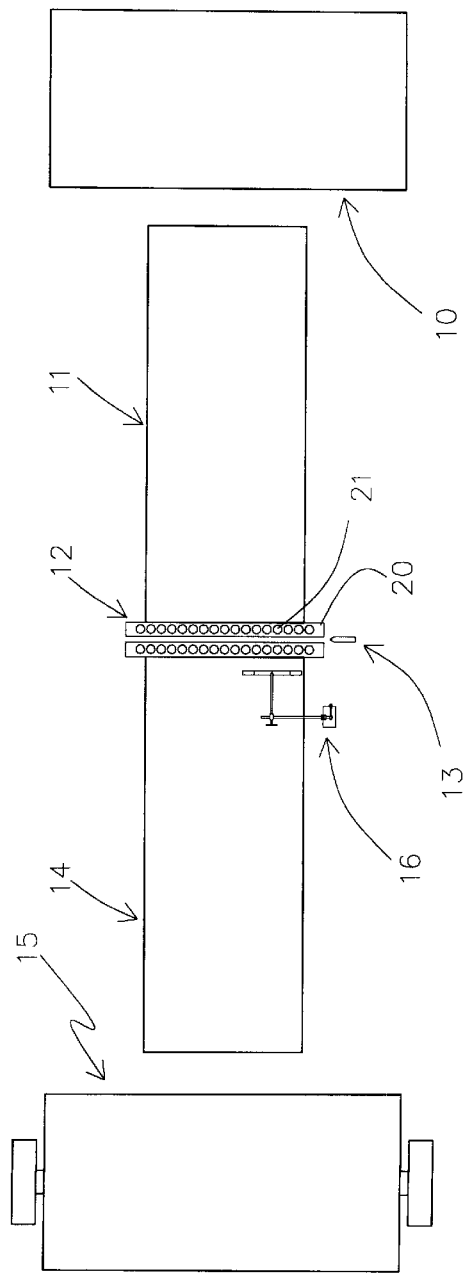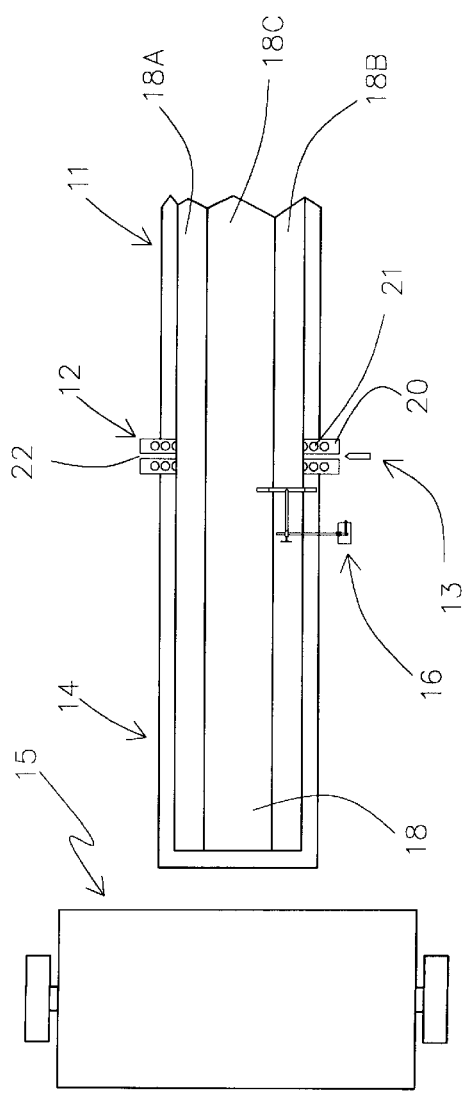

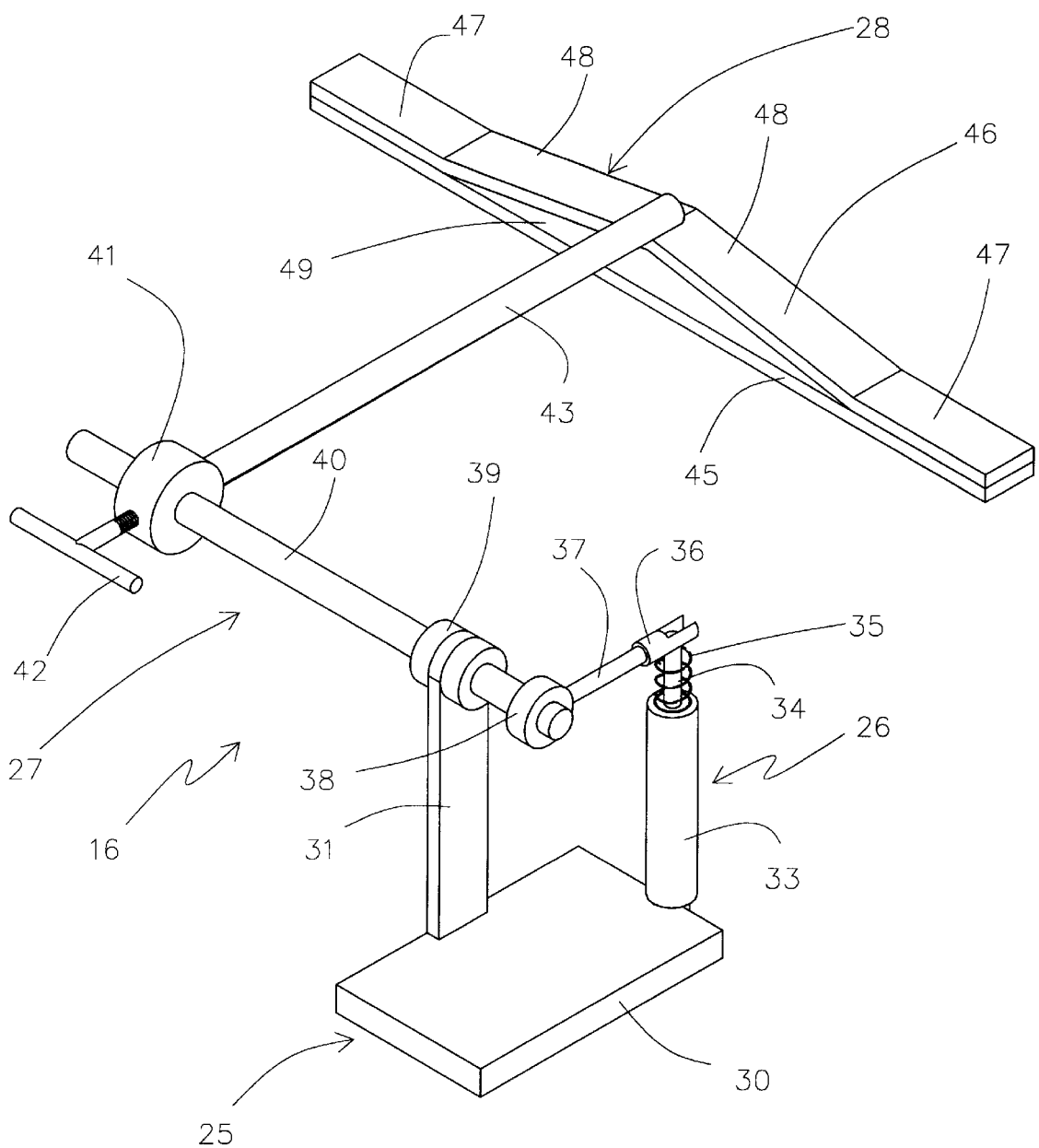
FIG.—3

PREASSEMBLY CUTTER CLAMP FOR USE DURING TIRE PRODUCTION

BACKGROUND OF THE INVENTION

1. Technical Field

The present invention relates to a clamping assembly for use during the cutting of predetermined lengths of tire material. More particularly, the present invention relates to a cutter clamp for use in cutting predetermined lengths from an elongated strip of tire material to be formed into a tire. Specifically, the present invention is a preassembly cutter clamp that is used to clamp one sidewall section of the elongated strip of tire material adjacent an air suction manifold for assuring a uniform and even cut by the cutter.

2. Background Information

In general, tires are manufactured along an assembly line including various stages, one of which involves the proper length cutting of a predetermined length of multi-ply material to be wrapped around a tire building drum on which the ends of the length are connected, the edges of the length are turned up to form a toroidal carcass. Currently, this cutting process begins when a roll of preassembly, that is a roll of multi-ply material including layers of rubber and belts, is transported to and loaded on the server. The outermost end of this preassembly is placed on a first conveyor and moved towards a manifold and cutter unit. During this process the preassembly passes a cutter unit and stops at a predetermined point. This predetermined point is a set distance beyond the cutter and toward the drum where the set distance is the linear equivalent of the desired tire circumference. The conveyor stops and the preassembly is held in place, typically by an air suction manifold positioned adjacent to the cutter unit so as to divide the conveyor into two sub-conveyors, one of which is on each side of the manifold. The preassembly is suctioned against the air suction manifold by a vacuum provided within the manifold and effective via numerous suction holes. A cutter then severs the preassembly into a desired length, where the cutter is typically either a sharpened knife blade or an ultrasonic knife. Once the cut is performed, the vacuum is shutoff and the conveyors activated. The cut length is then removed from the conveyor and wrapped around a tire building drum for assembly into a tire where such assembly includes connection of the ends, turning up of the edges or sidewalls typically using bladders. This process is repeated numerous times until the roll is depleted whereby the plurality of preselected lengths of multi-ply material are created and transformed into carcasses.

The cut supplied by this process is often uneven and nonuniform. This is a result of various shortcomings in the process. First, due to the contours and uneven profile of the sidewall along each edge of the unrolled preassembly, the suction manifold often cannot adequately hold the preassembly in place. Specifically, the sidewall contains various nonuniform components such as raised white letters and/or a whitewall strip, which are uneven, and the sidewall might have a slight curvature outward toward the edge. Therefore, in either case, the sidewall is not easily subjected to suction at the manifold. Second, the cutter often starts at one edge of the preassembly and cuts across the preassembly to the other edge resulting in a pulling force as the knife engages the preassembly thereby providing an uneven and nonuniform cut. In the alternative, the cutter may cut the preassembly from below the manifold, either in or adjacent to the manifold, such that the cutter lifts the preassembly during cutting thereby providing an uneven and nonuniform cut.

It is well known in the art that it is desirable to make this cut as even and uniform as possible so as to provide for easier, more economical, and more reliable connection of the edges of the cut length during building of the tire. Therefore, it is desirable to improve the cutting process on the preassembly in a tire building assembly line.

SUMMARY OF THE INVENTION

Objectives of the invention including providing an improved tire assembly process and assembly line.

A further objective of the present invention includes providing a more reliable and accurate cutting mechanism on a tire assembly line.

A further objective of the present invention includes providing an even and uniform cut of the preassembly.

A further objective of the present invention is to provide a predetermined length of a multi-ply material for use in making a tire where the predetermined length is created by an even and uniform cut at each end edge.

A further objective of the present invention includes providing a cutter clamp for use in holding the preassembly during cutting which results in an even and uniform cut of the cut length.

A further objective of the present invention includes providing a cutter clamp for use in holding one sidewall section of the preassembly during cutting.

A further objective of the present invention includes providing a cutter clamp that holds the lead edge of the preassembly during cutting.

A further objective of the present invention is to provide a cutter clamp that is operated by an air solenoid valve that is energized simultaneously with the application of a vacuum via the air suction manifold where the solenoid valve has a spring return.

A further objective of the invention is providing a cutter clamp of a flexible tension applying design.

These objectives and advantages are obtained by the improved cutter assembly of the present invention, the general nature of which may be stated as including a clamping mechanism for holding at least one edge of a strip of material during cutting of said strip to be used in tire production. The clamping mechanism including a clamp and an actuator. The clamp has a flat surface for selectively engaging said one edge of said strip material during cutting of said strip. The actuator is connected to the clamp for selectively moving said clamp into clamping engagement with said one edge of said strip of material. In addition, the general nature of the invention may further be stated as including a method of cutting a strip of material to be used in tire production. This method involves providing an elongated strip of tire making material to be cut into predetermined lengths to be formed into a tire, said elongated strip of tire making material having a center strip longitudinally surrounded by a pair of opposed edges. The method further involves suctioning said elongated strip to a planar surface adjacent a cut path. The next step in the method is clamping one of the edges of said strip of material to said planar face adjacent said cut path. The final step is cutting transversely across said strip of material along said cut path from said clamped edge to said opposed edge thereby creating said predetermined length to be formed into a tire.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is a diagrammatic top plan view showing a conveyor/manifold system with the cutter clamp of the present invention incorporated therein;

FIG. 2 is a fragmentary and diagrammatic view similar to FIG. 1 showing the movement of the preassembly strip of tire building material along the conveyor/manifold system;

FIG. 3 is an enlarged perspective view of the cutter clamp removed from the conveyor/manifold system of FIGS. 1 and 2;

Similar numerals refer to similar parts throughout the drawings.

DESCRIPTION OF THE PREFERRED EMBODIMENT

Figure 4:
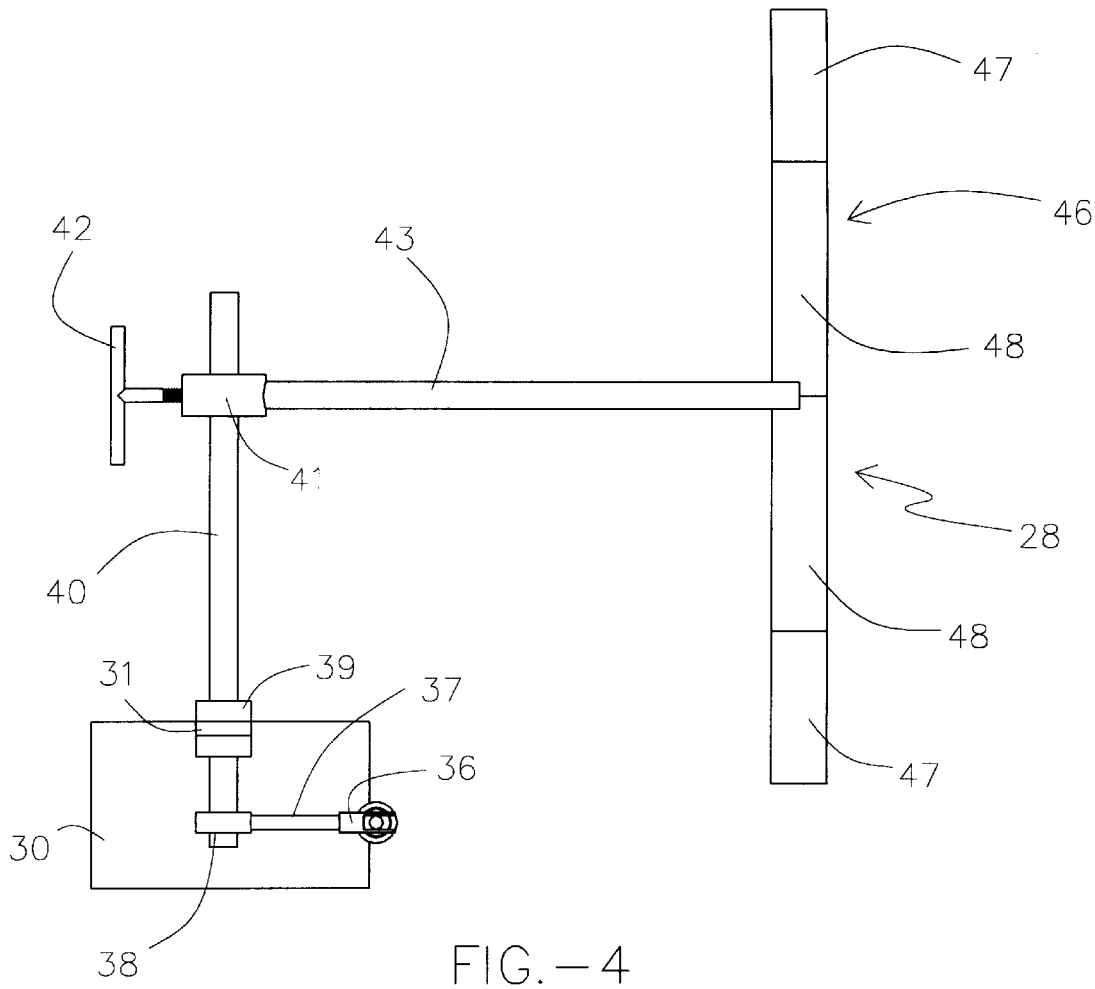
FIG. 4 is a reduced top plan view of the cutter clamp of FIG. 3.

The main components of the improved preassembly cutting system for use in a tire building process are shown particularly in FIGS. 1 and 2. In general, this tire cutting process includes a server 10, a first conveyor 11, a manifold 12 with a cutter 13 adjacent thereto, a second conveyor 14, and a tire building drum 15 all aligned sequentially. A cutter clamp assembly 16 provides clamping of the elongated preassembly material 18 (with a center 18c and two edges or sidewalls 18B and 18A) approximate manifold 12 and second conveyor 14. The server 10, manifold 12, cutter 13, first and second conveyors 11 and 14, and tire building drum 15 are well known in the art, and are thus shown diagrammatically since each could be of any number of various designs that would work equally well with the improved cutter clamp assembly 16.

Air suction manifold 12, as is shown in FIGS. 1 and 2, includes a flat top surface 20 having a plurality of suction holes 21 therein, preferably aligned in two rows transverse to the overall tire cutting assembly. Each of the suction holes is fluidly connected to any type of device capable of providing a vacuum or other equivalent suctioning force for inward suction in holes 21. Adjacent air suction manifold 12 is cutter 13 of any construction known in the art, including a mechanical knife or ultrasonic knife. Cutter 13 is drivable transversely across a cut path 22 within manifold 12 between the transverse rows of suction holes 21.

Figure 5:
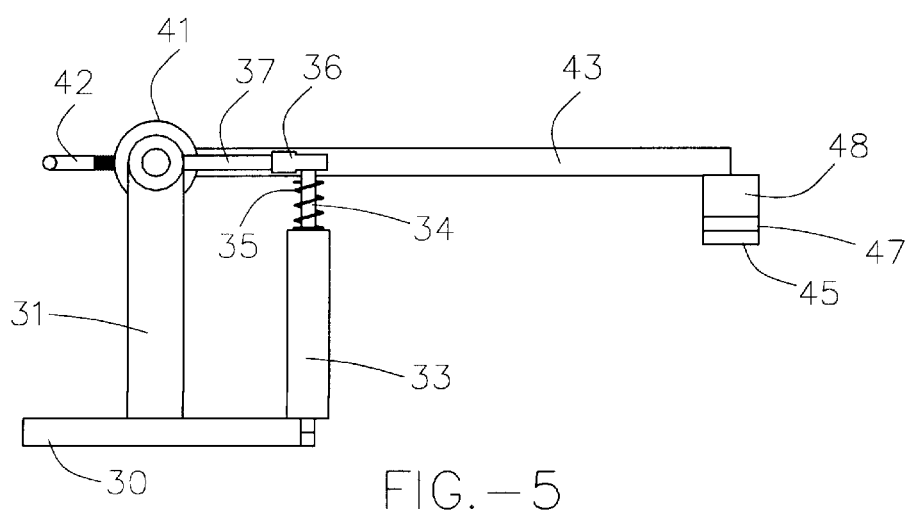
FIG. 5 is a side elevational view of the cutter clamp of FIGS. 3 and 4.

Cutter clamp assembly 16 is shown in more detail in FIGS. 3–5 as including a mount 25, an actuator 26, a motion translating assembly 27, and a clamp 28. Mount 25 includes a mounting bracket 30 with a support arm 31 extending therefrom that is designed to rotatably and securely receive a rotatable rod as described below.

Actuator 26 includes an air cylinder 33 with a drive rod 34 slidably extending therefrom and having a spring 35 therearound. Air cylinder 33 is rigidly affixed to mounting bracket 30. Drive rod 34 is operably affixed to motion translating assembly 27.

Motion translating assembly 27 includes a clevis 36, a motion translating rod 37, a lock collar 38, a bushing 39, a rotatable rod 40, an adjustable lock collar 41, an adjustment mechanism 42, and a clamping rod 43. Clevis 36 is pivotally connected to drive rod 34. Motion translating rod 37 is rigidly affixed at opposite ends to clevis 36 and lock collar 38. Lock collar 38 is rigidly affixed to rotatable rod 40.

Rotatable rod 40 is rotatable within support arm 31 via bushings 39. Opposite lock collar 38 on rotatable rod 40 is an adjustable lock collar 41 that may be axially adjusted along rotatable rod 40 between this opposite end and bushing 39. Once the desired axial position of adjustable lock collar 41 is set, adjustment mechanism 42 rigidly affixes adjustable lock collar 41 to rotatable rod 40 in both an axial and radial direction. Clamping rod 43 is rigidly connected to adjustable lock collar 41 in substantially the same manner as motion translating rod 37 is connected to lock collar 38, and in the most preferred embodiment this is by welding. Opposite the connection of adjustable lock collar 41 to clamping rod 43 is the connection of clamp 28 to clamping rod 43 by any known means, such as welding.

Clamp 28 includes an elongated substantially planar clamp bar 45 and a tension bar 46. Tension bar 46 includes a pair of planar ends 47 that are parallel with and affixed to the ends of clamp bar 45 and a pair of oblique sections 48 extending inward from parallel ends 47 to a center connection point where oblique sections 48 intersect with each other and the connection to clamping rod 43. A gap 49 exists between oblique sections 48 and clamp bar 45. Tension bar 46 is made of a flexible yet strong material such as metal, such that downward force from clamping rod 43 when clamp bar 45 has been blocked from further movement results in tension bar 46 applying tension to clamp bar 45 as oblique sections 48 are forced towards clamp bar 45.

Cutter clamp assembly 16 is positioned adjacent to either second conveyor 14 and/or manifold 12. This allows clamp 28 to selectively clamp one of the sidewall sections on a strip 18 adjacent to cutter 13 as is shown in FIG. 2.

Cutter clamp assembly 16 functions by translating motion from an actuated air cylinder 33 to clamp 28. Specifically, cylinder 33 is either partially evacuated or further pressurized so as to move a piston therein that is connected to drive rod 34. To activate clamping, drive rod 34 must be pulled into air cylinder 33 such that levis 36 is moved closer to cylinder 33. Since drive rod 34 is pivotally attached to clevis 36, linear movement of drive rod 34 further into cylinder 33 causes clevis 36 to pivot along with rod 37 about rod 40 at lock collar 38 which is rigidly affixed to rod 40.

As rod 40 rotates within bushing 39, adjustable lock collar 41, which is tightened to rod 40 by adjustment mechanism 42, pivots clamping rod 43 about rod 40 at collar 41. Clamp 28 rotatably moves about an axis within rod 40 in the same manner as rod 43 rotatably moves about the axis of rod 40.

Clamp 28 moves towards and engages the edge of strip 18, specifically one sidewall 18B. When clamp bar 45 engages sidewall 18B, tension bar 46 provides a downward force as rod 43 exerts additional rotational motion on clamp 28. The result is a spring-load in oblique sections 48 of tension bar 46 which exerts downward force on the opposed outer edges of clamp bar 45 via ends 47. This securely holds sidewall 18B during the initiation of cutter 13 while the suction force from manifold 12 is sufficient during the remainder of the cut.

In operation, a roll of typically multi-ply, relatively planar material including both rubber and metal belts is transported and loaded onto server 10. The outermost edge of the roll is fed to first conveyor 11 so as to be conveyed along the extent of first conveyor 11 to manifold 12 and then second conveyor 14 as is shown in FIG. 2 as an elongated strip 18 of material, often referred to as preassembly. Once strip 18 reaches a preselected position, that is a specific distance from cutter 13 that is equivalent to the desired tire circumference, first conveyor 11 and second conveyor 14 stop advancing strip 18. Cutter clamp assembly 16 and air suction manifold 12 then simultaneously hold strip 18 for cutting by cutter 13. Specifically, actuator 26 moves clamp 28 downward into engagement with sidewall 18B. After cutting, first conveyor 11 and second conveyor 14 again advance strip 18 such that the previously cut strip is advanced to the tire building d m 15 for wrapping therearound followed by end connection, edge turn up via bladders, and inflation thereof after bead ring sealing. Typically concurrent therewith, strip 18 is advanced again to a preselected distance beyond cutter 13 equivalent to the desired circumference of the next tire to be made.

This clamping allows a smooth, even and uniform cut, particularly at cut inception. The result is a properly sized strip with square ends from which the carcass is more readily and rapidly created.

Accordingly, the improved cutter assembly is simplified, provides an effective, safe, inexpensive, and efficient device which achieves all the enumerated to objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cutter assembly is constructed and used, the characteristics of the construction, and the advantageous, new and useful results obtained; the new and useful structures, devices, elements, arrangements, parts and combinations, are set forth in the appended claims.

What is claimed is:

1. In combination, a strip of material to be used in tire production; a conveyor having an upper surface, the strip being carried by the upper surface of the conveyor; and a clamping mechanism holding at least one edge of the strip of material against said upper surface of the conveyor during cutting of said strip, the clamping mechanism comprising:

a clamp including a clamp bar and a tension bar, wherein the clamp bar engages said strip of material the tension bar being rigidly affixed to only the ends of the clamp bar and having a middle portion that is spaced from the clamp bar such that a force pressing the tension bar toward the clamp bar provides a tensile force to the clamp bar resulting in the uniform engagement of the clamp bar and the strip of material when the strip of material is engaged by the clamp bar; and an actuator connected to the tension bar, the actuator selectively moving the clamp into clamping engagement with said strip of material, the actuator creating the force that presses the tension bar toward the clamp bar when the clamp engages the strip.

2. The combination of claim 1, wherein the clamp is spring away from the strip of material and the conveyor.

3. The combination of claim 2, wherein the tension bar has opposed ends that are rigidly affixed, respectively, to the ends of the clamp bar.

4. The combination of claim 3, wherein the actuator includes an air cylinder with an actuatable drive rod connected to the tension bar.

5. The combination of claims 4, wherein a motion translating mechanism connects the actuatable drive rod to the tension bar.

6. The combination of claim 5, wherein the motion translating mechanism includes a motion translating rod, a rotatable rod connected to the motion translating rod, and a clamping rod connected to the rotatable rod.

7. The combination of claim 6, wherein the motion translating rod is connected to the drive rod by a clevis, the motion translating rod being rigidly affixed to one end of the rotatable rod while the clamping rod is adjustably affixed to the other end, and the clamping rod is rigidly affixed to the tension bar.

8. The combination of claim 7, wherein the motion translating rod and the clamping rod are pivotably movable about the rotating rod while the rotating rod is rotatably affixed to a mounting bracket.

9. In combination, a strip of material to be used in tire production; a conveyor carrying the strip of material; and a clamping mechanism holding at least one edge of the strip of material during cutting of said strip, the clamping mechanism comprising:

a clamp having a clamp bar that engages the strip of material while the strip of material is being cut; the clamp further having a tension bar, the tension bar having a pair of ends that are each rigidly affixed to the clamp bar, the tension bar further having a pair of oblique sections between its ends that are spaced from the clamp bar to form a gap between the oblique sections and the clamp bar;

a base:

a motion translating assembly carried by the base, the motion translating assembly engaging the oblique sections; and an actuator connected to the motion translating assembly, the actuator selectively moving the clamp into clamping engagement with said strip of material, wherein said actuator forces the motion translating assembly against the tension bar forcing the tension bar towards the clamp bar to create a tensile force in the clamp bar.

* * * * *